(12) United States Patent
Yoshida

(10) Patent No.: US 10,630,953 B2
(45) Date of Patent: Apr. 21, 2020

(54) CHARACTERIZATION SYSTEM FOR EVALUATING CHARACTERISTICS OF DISPLAY DEVICE

(71) Applicant: Sharp Kabushiki Kaisha, Sakai, Osaka (JP)

(72) Inventor: Hidefumi Yoshida, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/509,660

(22) Filed: Jul. 12, 2019

(65) Prior Publication Data

US 2020/0021788 A1    Jan. 16, 2020

Related U.S. Application Data

(60) Provisional application No. 62/728,236, filed on Sep. 7, 2018, provisional application No. 62/696,932, filed on Jul. 12, 2018.

(51) Int. Cl.
*H04N 9/68* (2006.01)
*H04N 9/67* (2006.01)
*G09G 3/20* (2006.01)

(52) U.S. Cl.
CPC ............. *H04N 9/68* (2013.01); *G09G 3/2003* (2013.01); *H04N 9/67* (2013.01); *G09G 2320/0666* (2013.01); *G09G 2340/06* (2013.01)

(58) Field of Classification Search
CPC .................. G09G 2320/0233; H04N 9/73
See application file for complete search history.

(56) References Cited

U.S. PATENT DOCUMENTS

2013/0155193 A1*  6/2013  Ikeda ............... G06T 7/0002
                                                                            348/46

* cited by examiner

*Primary Examiner* — Paulos M Natnael
(74) *Attorney, Agent, or Firm* — Keating & Bennett, LLP

(57) ABSTRACT

[Object] To provide technology that enables the characteristics of a display device to be appropriately evaluated.

[Solution] Values Xn, Yn, and Zn are set based on tristimulus values obtained by measuring, by the optical measuring device, a first display state where white is displayed to fill a screen of the display device. Tristimulus values obtained by measuring a second display state by the optical measuring device are set as values X, Y, and Z. In the second display state, a color including at least one of red, green, blue, white, and black is displayed in at least part of the screen of the display device. Values L*, a*, and b* are calculated by transforming the values Xn, Yn, and Zn and the values X, Y, and Z. A color volume of a color space formed from the values L*, a*, and b* is calculated. The value Yn in the first display state and the color volume are output.

16 Claims, 9 Drawing Sheets

(a)

| Color | x | y | Y(cd/m²) |
|---|---|---|---|
| White(full screen) | 0.2771 | 0.2824 | 540.31 |
| R | 0.6682 | 0.3058 | 101.56 |
| G | 0.2571 | 0.6687 | 400.33 |
| B | 0.1552 | 0.0353 | 34.55 |
| C | 0.1944 | 0.2769 | 433.04 |
| M | 0.2862 | 0.1051 | 137.14 |
| Y | 0.4041 | 0.5403 | 493.42 |
| White | 0.2771 | 0.2824 | 540.31 |
| Black | 0.3470 | 0.3510 | 0.2538 |

(b)

(a)

| Color | x | y | Y(cd/m²) |
|---|---|---|---|
| White(full screen) | 0.2771 | 0.2824 | 540.31 |
| R | 0.6000 | 0.2900 | 101.56 |
| G | 0.2600 | 0.6000 | 400.33 |
| B | 0.1800 | 0.1000 | 34.55 |
| C | 0.2100 | 0.2800 | 433.04 |
| M | 0.2850 | 0.1300 | 137.14 |
| Y | 0.3900 | 0.5000 | 493.42 |
| White | 0.2771 | 0.2824 | 540.31 |
| Black | 0.3470 | 0.3510 | 0.2538 |

(b)

Color volume = 588,349

(a)

| Color | x | y | Y (cd/m²) |
|---|---|---|---|
| White (full screen) | 0.2771 | 0.2824 | 540.31 |
| R | 0.6682 | 0.3058 | 101.56 |
| G | 0.2571 | 0.6687 | 400.33 |
| B | 0.1552 | 0.0353 | 34.55 |
| C | 0.1944 | 0.2769 | 433.04 |
| M | 0.2862 | 0.1051 | 137.14 |
| Y | 0.4041 | 0.5403 | 493.42 |
| White | 0.2771 | 0.2824 | 1030.00 |
| Black | 0.3470 | 0.3510 | 0.2538 |

(b)

Color volume = 583,966

(a)

| Color | x | y | Y(cd/m²) |
|---|---|---|---|
| White(full screen) | 0.2771 | 0.2824 | 540.00 |
| R | 0.6682 | 0.3058 | 193.6 |
| G | 0.2571 | 0.6687 | 763.1 |
| B | 0.1552 | 0.0353 | 65.86 |
| C | 0.1944 | 0.2769 | 825.5 |
| M | 0.2862 | 0.1051 | 261.4 |
| Y | 0.4041 | 0.5403 | 940.6 |
| White | 0.2771 | 0.2824 | 1030.00 |
| Black | 0.3470 | 0.3510 | 0.4837 |

(b)

FIG. 11
(a) Basic configuration with CIELAB
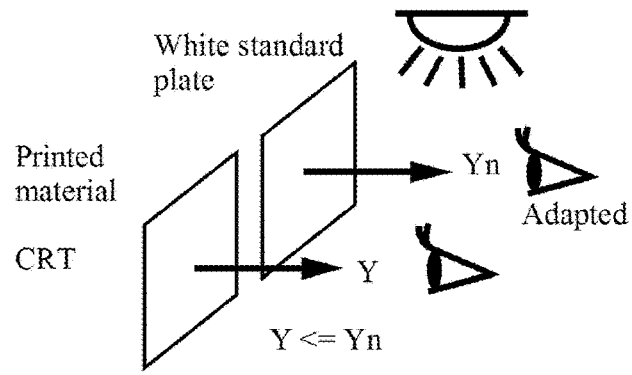
(b) Emissive or transmissive DSP with appropriate normalization?
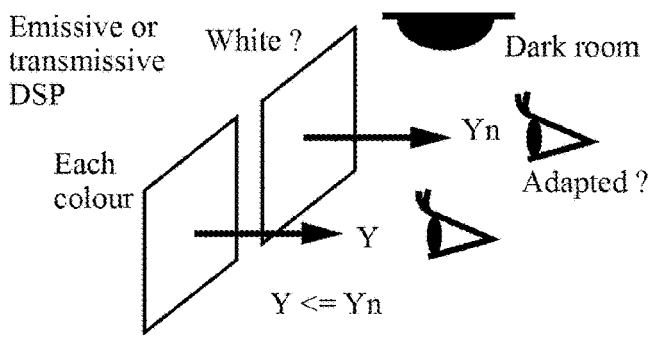
(c) Color volume with typical case
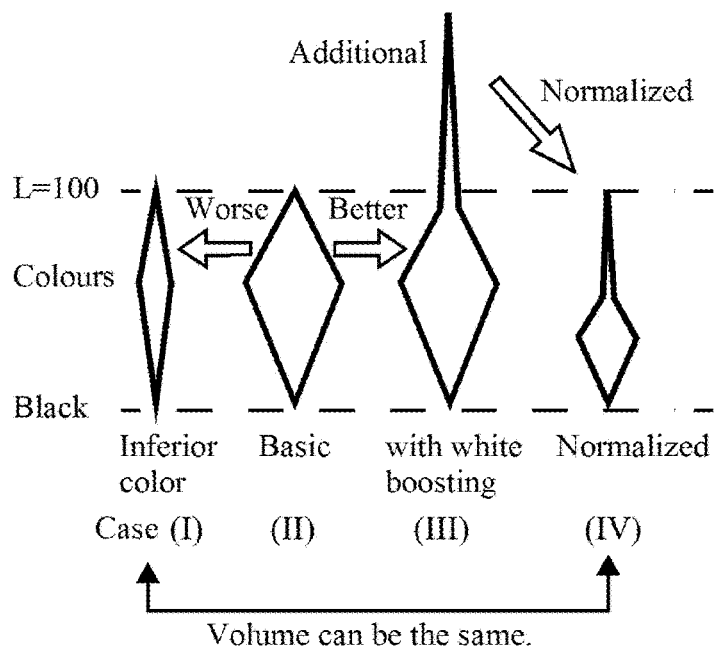

CHARACTERIZATION SYSTEM FOR EVALUATING CHARACTERISTICS OF DISPLAY DEVICE

TECHNICAL FIELD

The present invention relates to a characterization system for evaluating the characteristics of a display device.

BACKGROUND ART

To date, CIE (Commission Internationale de l'Eclairage) has proposed CIELAB as an index for evaluating the characteristics of a display device. In the evaluation using CIELAB, lightness, color balance, contrast, and the like in an XYZ color space are expressed by using coordinate axes L*, a*, and b*.

CITATION LIST

Non Patent Literature

[NPL 1] Noboru Ohta, "Color engineering" Tokyo Denki University Press, ISBN4-501-61890-6, p. 73 and p. 127
[NPL 2] IEC TR 62977-2-3: 2017

SUMMARY OF INVENTION

Technical Problem

However, some display devices in recent years have a high peak luminance and further have not only RGB pixels but also W pixels, and thus there is a problem that evaluation using CIELAB does not enable the superiority or inferiority of the characteristics of a display device to evaluate accurately.

An aspect of the present invention is provided under the foregoing circumstances and aims to provide technology that enables the characteristics of a display device to be evaluated appropriately.

Solution to Problem (1) An embodiment of the present invention is a characterization system that evaluates a display characteristic of a display device. The characterization system includes: a controller device that controls displaying performed by the display device; and an optical measuring device. The controller device sets values Xn, Yn, and Zn based on tristimulus values X1, Y1, and Z1 obtained by measuring, by the optical measuring device, a first display state where white is displayed to fill a screen of the display device, sets, as values X, Y, and Z, tristimulus values obtained by measuring, by the optical measuring device, a second display state where a color including at least one of red, green, blue, white, and black is displayed in at least part of the screen of the display device, calculates values L*, a*, and b* by transforming the values Xn, Yn, and Zn and the values X, Y, and Z, calculates a color volume of a color space formed from th values L*, a*, and b*, and outputs the value Yn in the first display state and the color volume. Note that it goes without saying that the second display state includes display in which color is displayed evenly on the entire display plane.

(2) An embodiment of the present invention is the characterization system with the configuration in (1) above. In the characterization system, Xn=X1, Yn=Y1, and Zn=Z1 are respectively set for the values Xn, Yn, and Zn.

(3) An embodiment of the present invention is the characterization system with the configuration in (1) above. In the characterization system, Xn=A×X1/Y1, Yn=A, and Zn=A×Z1/Y1 are calculated with a fixed value serving as A.

(4) An embodiment of the present invention is the characterization system with the configuration in (1) above. In the characterization system, 100 cd/m² is used as a fixed value serving as A.

(5) An embodiment of the present invention is the characterization system with the configuration in (1) above. In the characterization system, 1000 cd/m² is used as a fixed value serving as A.

(6) An embodiment of the present invention is the characterization system with the configuration in (1) above, (2) above, (3) above, (4) above, or (5) above. In the characterization system, the second display state includes a state where a multicolor pattern is displayed by the display device.

(7) An embodiment of the present invention is the characterization system with the configuration in (1) above, (2) above, (3) above, (4) above, or (5) above. In the characterization system, the second display state includes a state where the display device performs gray window display in which a color display window with a gray background is located in a central portion of the gray background.

(8) An embodiment of the present invention is the characterization system with the configuration in (1) above. In the characterization system, the second display state includes a state where the display device performs gray window display in which a color display window with a white background is located in a central portion of the white background and where a screen proportion of the color display window ranges from 2% to 50% and is preferably 25%.

(9) An embodiment of the present invention is the characterization system with the configuration in (8) above. In the characterization system, in the second display state, the screen proportion of the color display window in the central portion is 25%.

(10) An embodiment of the present invention is the characterization system with the configuration in (1) above, (2) above, (3) above, (4) above, (5) above, (6) above, (7) above, (8) above, or (9) above. In the characterization system, the second display state includes a state where a neutral color based on at least one of red, green, blue, white, and black is displayed.

(11) An embodiment of the present invention is the characterization system with the configuration in (1) above, (2) above, (3) above, (4) above, (5) above, (6) above, or (7) above, (8) above, (9) above, or (10) above. In the characterization system, the optical measuring device is a spectrometer that measures a spectral value in each of the first display state and the second display state.

(12) An embodiment of the present invention is a characterization method for evaluating a display characteristic of a display device. The method includes: setting values Xn, Yn, and Zn based on tristimulus values X1, Y1, and Z1 obtained by measuring a first display state where white is displayed to fill a screen of the display device; setting, as values X, Y, and Z, tristimulus values obtained by measuring a second display state where a color including at least one of red, green, blue, white, and black is displayed in at least part of the screen of the display device; calculating values L*, a*, and b* by transforming the values Xn, Yn, and Zn and the values X, Y, and Z; calculating a color volume of a color space formed from the values L*, a*, and b*; and outputting the value Yn in the first display state and the color volume.

(13) An embodiment of the present invention is characterization method for evaluating a display characteristic of a display device, the method includes: setting values Xn, Yn, and Zn based on tristimulus values X1, Y1, and Z1 obtained by measuring a first display state where white is displayed to fill a screen of the display device; setting, as X, Y, and Z, tristimulus values obtained by measuring a second display state where a color including at least one of red, green, blue, white, and black is displayed in at least part of the screen of the display device; calculating values L*, a* and b* by transforming the values Xn, Yn, Zn, X, Y, and Z; calculating a color volume of a color space formed from the values L*, a*, and b*; outputting the value Yn in the first display state and the color volume; setting the output color volume as V1; concurrently, based on the tristimulus values X1, Y1, and Z1 obtained by measuring the first display state where white is displayed to fill the screen of the display device, setting the values Xn, Yn, and Zn by using 100 cd/m$^2$ or 1000 cd/m$^2$ as a fixed value A; setting, as X, Y, and Z, the tristimulus values obtained by measuring the second display state where the color including the at least one of red, green, blue, white, and black is displayed in the at least part of the screen of the display device; calculating values L*, a*, and b* by transforming the values Xn, Yn, Zn, X, Y, and Z; calculating a color volume of a color space formed from the values L*, a*, and b*; outputting the value Yn in the first display state and the color volume; setting the output color volume as V2; setting values Xn, Yn, and Zn based on tristimulus values obtained by measuring the third display state where white is displayed in at least part of the screen of the display device; setting, as X, Y, and Z, the tristimulus values obtained by measuring the second display state where the color including the at least one of red, green, blue, white, and black is displayed in the at least part of the screen of the display device; calculating values L*, a*, and b* by transforming the values Xn, Yn, Zn, X, Y, and Z; calculating a color volume of a color space formed from the values L*, a*, and b*; outputting the value Yn in the first display state and the color volume; setting the output color volume as V3; and outputting a numerical value representing a display characteristic, the numerical value being obtained by weighting and adding up the color volumes respectively set as V1, V2, and V3 or being calculated by weighting and averaging the color volumes respectively set as V1, V2, and V3.

(14) An embodiment of the present invention is the characterization method with the configuration in (13) above. In the characterization method, calculation of the numerical value obtained by weighting and adding up the color volumes respectively set as V1, V2, and V3 is performed by using a calculation expression that is V1×1/3+V2+V3×1/5.

(15) An embodiment of the present invention is the characterization method with the configuration in (13) above. In the characterization method, calculation of a numerical value calculated by weighting and averaging the color volumes respectively set as V1, V2, and V3 is performed by using a calculation expression that is (V1×2+V2×5+V3×1)/8.

(16) An embodiment of the present invention is the characterization method with the configuration in (13) above. In the characterization method, calculation of a numerical value calculated by weighting and averaging the color volumes respectively set as V1, V2, and V3 is performed by using a calculation expression that is (V1+V2×7)/8.

Advantageous Effects of Invention

According to the aspects of the present invention, the characteristics of the display device can be made appropriate accurately.

Figure 6:
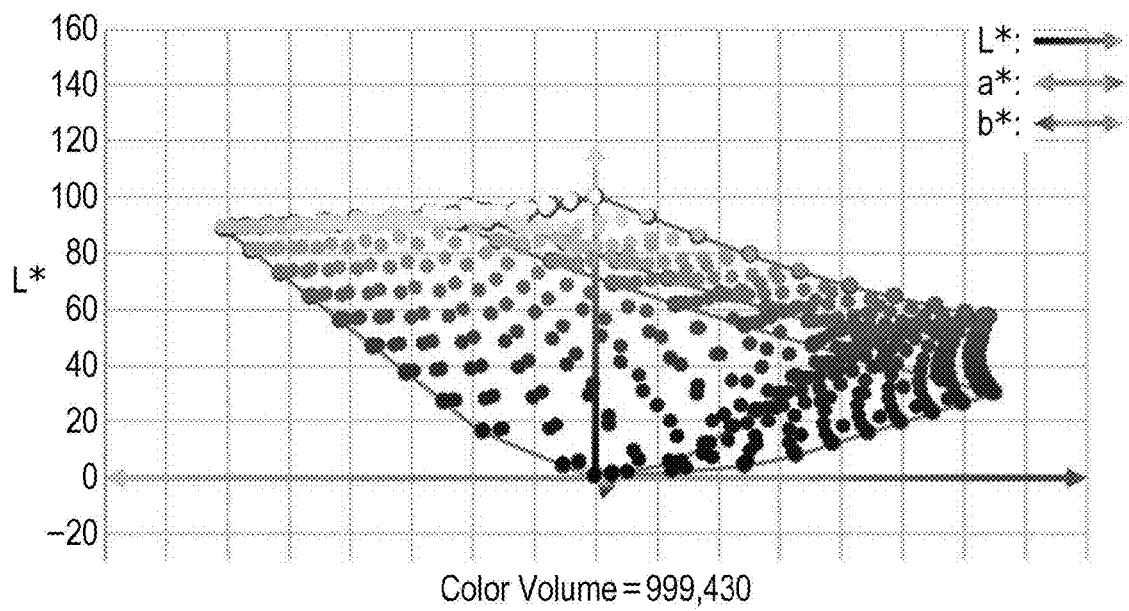

Part (a) of FIG. 6 is a table illustrating the characteristics of a display in an xyY color system, and part (b) of FIG. 6 is a graph illustrating the color volume of a color space formed from L*, a*, and b*.

Figure 7:
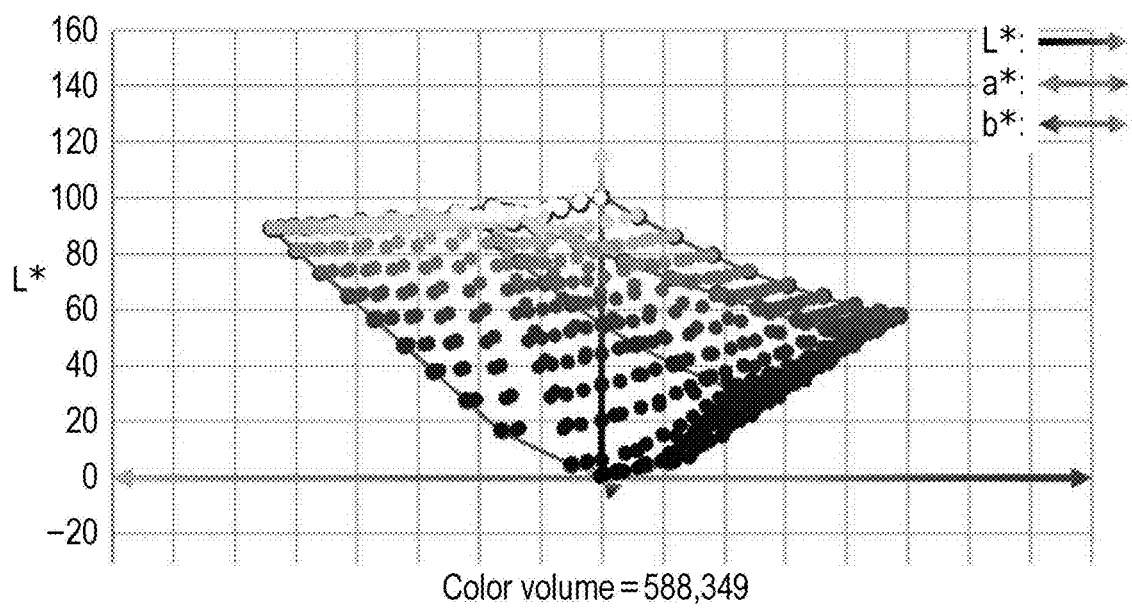

Part (a) of FIG. 7 is a table illustrating the characteristics of a display in the xyY color system, and part (b) of FIG. 7 is a graph illustrating the color volume of a color space formed from L*, a*, and b*.

Figure 8:
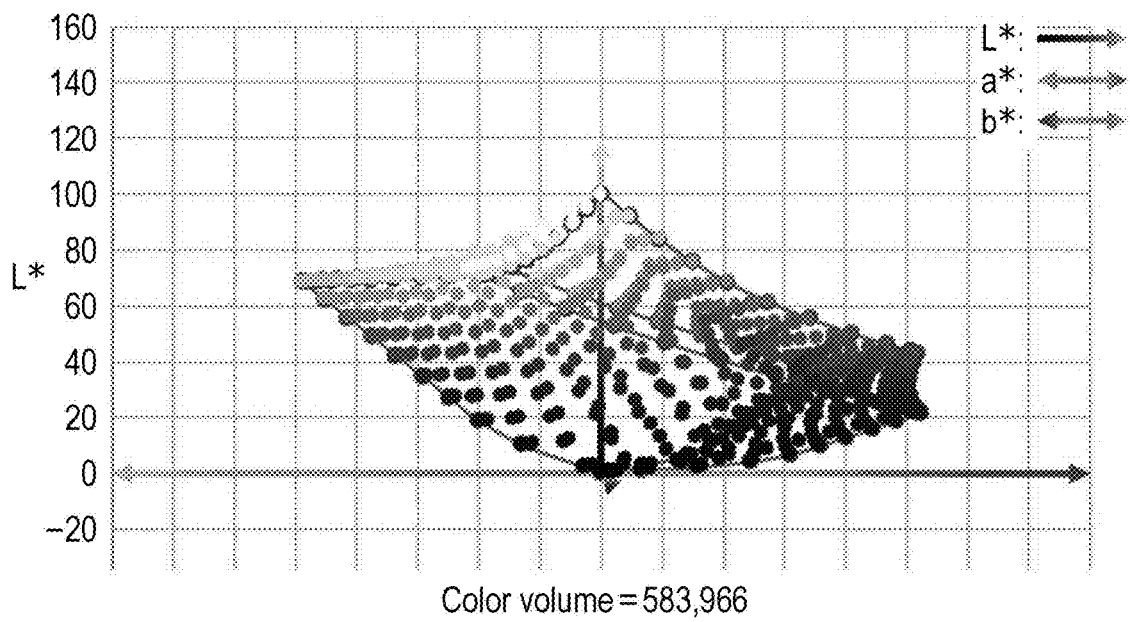

Part (a) of FIG. 8 is a table illustrating the characteristics of a display in the xyY color system, and part (b) of FIG. 8 is a graph illustrating the color volume of a color space formed from L*, a*, and b*.

Figure 9:
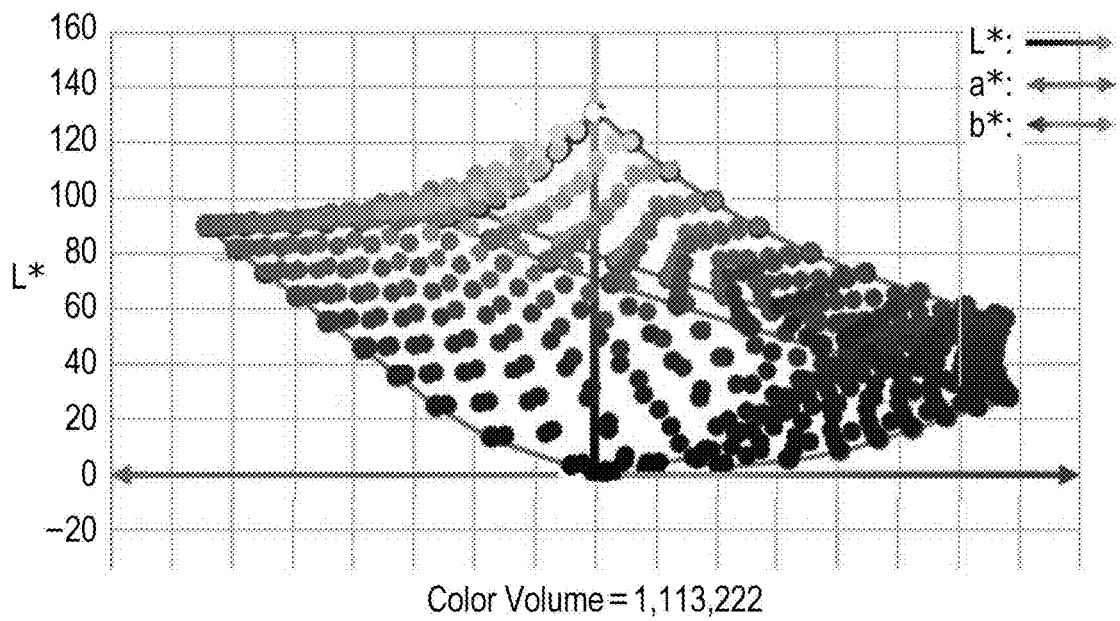

Part (a) of FIG. 9 is a table illustrating the characteristics of a display in the xyY color system, and part (b) of FIG. 9 is a graph illustrating the color volume of a color space formed from L*, a*, and b*.

Figure 10:
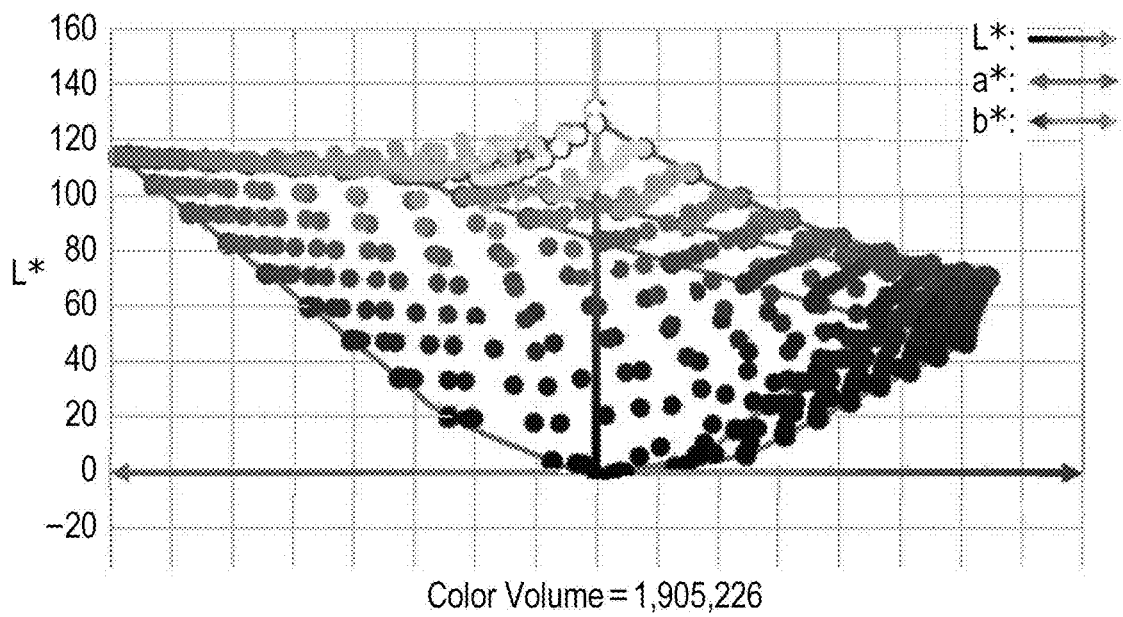

Part (a) of FIG. 10 is a table illustrating the characteristics of a display in the xyY color system, and part (b) of FIG. 10 is a graph illustrating the color volume of a color space formed from L*, a*, and b*.

Parts (a) and (b) of FIG. 11 are diagrams each schematically illustrate the outline configuration of a system that evaluates the characteristics of a reflective display by using CIELAB, and part (c) of FIG. 11 is a diagram schematically illustrating the color volumes of standard displays.

DESCRIPTION OF THE EMBODIMENTS

Figure 1:
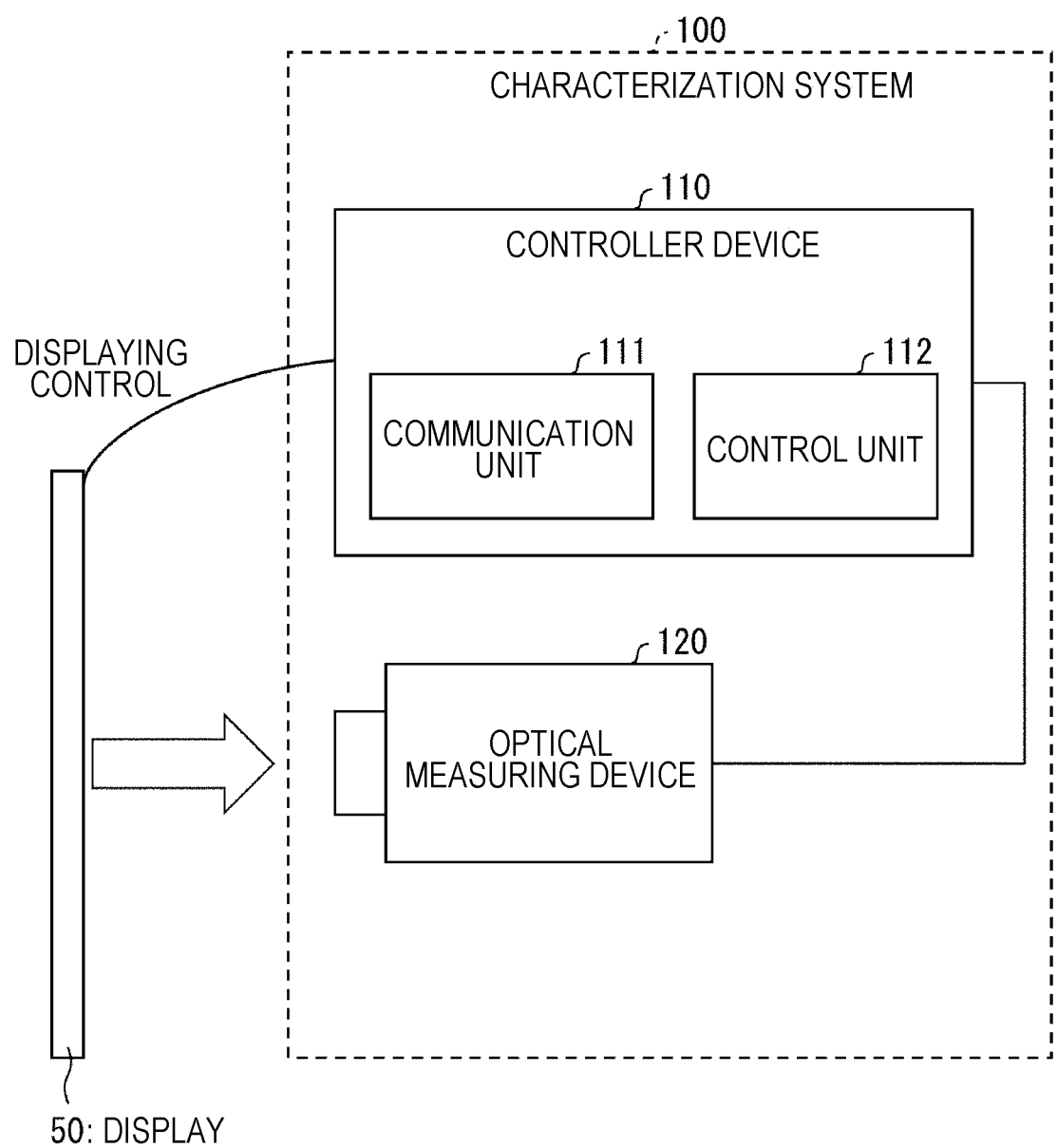
FIG. 1 is a block diagram illustrating the outline configuration of a characterization system.

FIG. 1 is a block diagram illustrating the outline configuration of a characterization system 100 according to an embodiment of the present invention. As illustrated in FIG. 1, the characterization system 100 includes a controller device 110 and an optical measuring device 120.

The controller device 110 has a function of outputting signals for displaying on a display (display device) 50 and controls displaying of the display 50. The controller device 110 also controls the optical measuring device 120 by transmitting a control signal for instructing the optical measuring device 120 to measure a spectrum of the display 50. The optical measuring device 120 is a spectrometer that measures the tristimulus values of the spectrum of the display 50 in a display state. The optical measuring device 120 transmits the result of the measurement to the controller device 110. The controller device 110 receives the result of the measurement by the optical measuring device 120 and evaluates the characteristics of the display 50 based on the result of the measurement.

The display 50 of this embodiment is a display of a type other than a reflective type. As the display, for example, a transmissive direct-view display represented by a liquid crystal display device, an emissive direct-view display represented by an OLED (organic EL display), a projection display represented by a display using a liquid crystal panel or a display using a DMD (dynamic mirror display) for operating a reflection mirror, and other displays are widely used.

Conventional Evaluation Method

CIE (Commission Internationale de l'Eclairage) has proposed CIELAB as an index for evaluating the characteristics of a reflective display device. Parts (a) and (b) of FIG. 11 are diagrams each schematically illustrating an outline configuration for evaluating the characteristics of the reflective display by using CIELAB.

In a case where the characteristics of the reflective display are evaluated by using CIELAB, tristimulus values X, Y, and Z can be expressed with Formulas (1) to (5) below. In the following Formulas, k denotes the constant of the luminous efficacy, $\int_{vis}$ denotes obtaining the tristimulus values in the visible wavelength region, $\varphi(\lambda)$ denotes a color stimulus, x, y, and z each denote a color matching function, $R(\lambda)$ denotes the spectral reflectance of a reflecting object, and $P(\lambda)$ denotes the spectral distribution of illumination light.

$$X = k\int_{vis}\varphi(\lambda) \cdot x(\lambda)d\lambda \quad \text{(Formula 1)}$$

$$Y = k\int_{vis}\varphi(\lambda) \cdot y(\lambda)d\lambda \quad \text{(Formula 2)}$$

$$Z = k\int_{vis}\varphi(\lambda) \cdot z(\lambda)d\lambda \quad \text{(Formula 3)}$$

$$\varphi(\lambda) = R(\lambda) \cdot P(\lambda) \quad \text{(Formula 4)}$$

$$k = 100/\int_{vis}P(\lambda) \cdot y(\lambda)d\lambda \quad \text{(Formula 5)}$$

Note that in a case where the tristimulus values of the white luminance of a perfect reflecting diffuser are set as Xn, Yn, and Zn and where X, Y, and Z undergo linear transformation to an L*a*b* color system, L*, a*, and b* can be respectively expressed by Formulas (6) to (8) below. Note that Yn is normalized as Yn=100.

$$L^* = 116 f(Y/Yn) - 16 \quad \text{(Formula 6)}$$

$$a^* = 500\{f(X/Xn) - f(Y/Yn)\} \quad \text{(Formula 7)}$$

$$b^* = 200\{f(Y/Yn) - f(Z/Zn)\} \quad \text{(Formula 8)}$$

Note that in the range of X/Xn>0.008856, Formula (9) below is used as f(X/Xn).

$$f(X/Xn) = (X/Xn)^{1/3} \quad \text{(Formula 9)}$$

In addition, in the range of X/Xn≤0.008856, Formula (10) below is used as f(X/Xn).

$$f(X/Xn) = 7.787(X/Xn) + 16/116 \quad \text{(Formula 10)}$$

In a case where the characteristics of the reflective display are evaluated, a color including at least one of red, green, blue, white, and black is displayed on the display, and L*, a*, and b* are obtained. In addition, a neutral color based on at least one of red, green, blue, white, and black is displayed on the display, and L*, a*, and b* are obtained. Values of each of L*, a*, and b* are then plotted in a space with axes of respective L*, a*, and b*, and the volume of a solid composed of a set of these points is obtained. The volume of L*, a*, and b* obtained in this manner is referred to as a color volume.

If the perfect reflecting diffuser is installed in a general room, and if the illumination of the room is approximately 500 lux, the Y value of the luminance resulting from reflection from the perfect reflecting diffuser is approximately 150 cd/m² (strictly speaking, 500/π=159.23). For example, a low luminance display such as a CRT (cathode ray tube) display has a maximum luminance lower than the luminance resulting from the reflection from the perfect reflecting diffuser. Accordingly, it is not possible to discriminate between a color volume obtained from the reflection from the reflecting surface and a color volume obtained from the displaying with the display.

Hence, to evaluate the characteristics of a display, a method by which tristimulus values Xn, Yn, and Zn at the maximum white luminance of the display are obtained instead of obtaining L*, a*, and b* based on the white luminance of the perfect reflecting diffuser has also been proposed (see part (b) of FIG. 11).

Displays in recent years have a high maximum luminance of, for example, approximately 600 cd/m², which exceeds the luminance obtained from the reflection from the perfect reflecting diffuser. In addition, displays in recent years that have not only RGB pixels but also W pixels and that perform special display by using the W pixels have also been proposed. Accordingly, the conventional characterization method by which the tristimulus values of the white luminance of the perfect reflecting diffuser are set as Xn, Yn, and Zn and the color volume is calculated does not enable the characteristics of a display to be appropriately evaluated in some cases.

Part (c) of FIG. 11 is a diagram schematically illustrating the color volumes of standard displays. Sub-part (II) of part (c) of FIG. 11 is a schematic side view of the color volume of a standard display. In contrast, subpart (I) of part (c) of FIG. 11 illustrates an example schematic side view of the color volume of a display with pale and unbrilliant colors. Sub-part (III) of part (c) of FIG. 11 is a schematic side view of the color volume of a display having white subpixels (RGB+W) and having an additional function of boosting only white displaying with respect to the display illustrated in subpart (II) of part (c) of FIG. 11.

The display in subpart (III) of part (c) of FIG. 11 has a high white luminance. Accordingly, in a case where tristimulus values Xn, Yn, and Zn at the maximum white luminance are used and thereby L*, a*, and b* are calculated from the tristimulus values X, Y, and Z at the time of displaying red, green, blue, white, and black and a neutral color based on these, the color volume is shaped as illustrated in subpart (IV) of part (c) of FIG. 11, and the volume is also small.

According to the conventional characterization method, when being compared with each other, subpart (I) of part (c) of FIG. 11 and subpart (IV) of part (c) of FIG. 11 have the same volume. The displays are thus determined to have the same characteristics. However, actually, the characteristics of the display in subpart (I) of part (c) of FIG. 11 are inferior to those of the display in subpart (II) of part (c) of FIG. 11, and the characteristics of the display in subpart (IV) of part (c) of FIG. 11 are superior to those of the display in subpart (II) of part (c) of FIG. 11.

As described above, in the case where the conventional characterization method by which a color volume is calculated by using CIELAB is applied to a current newest display, it cannot be said that the superiority or inferiority of the characteristics of the display is accurately evaluated, and thus there is a major problem.

In contrast, a method for evaluating a display by using two-dimensional xy color reproduction coordinates and the maximum white luminance only is also known. However, in a display having not only RGB pixels but also W subpixels, the luminance of W (white) can be specially raised, and thus favorable values are obtained as long as only a color of white is concerned, although the RGB color luminance cannot be raised. Accordingly, in a case where a device A having RGB pixels and a device B having RGBW pixels are compared with each other, the device A has RGB luminance balanced with the white luminance when the RGB color coordinates are favorable at a white luminance of 300 cd/m$^2$. In contrast, in the device B, even though the white luminance of 300 cd/m$^2$ is achieved and the RGB color coordinates are favorable, the RGB luminance is lower than the white luminance and is not balanced therewith in some cases. This is because only white is specially made bright.

In the device B, the RGB color luminance is lower than the white luminance, is not well balanced with the white luminance, thus causes a color with a relatively low luminance, and thus causes an event in which the color looks paler. This is caused by an effect in which when colors with the same color coordinates are displayed, a display with a higher luminance looks more brilliant. Accordingly, in the method for evaluating a display by using the two-dimensional xy color reproduction coordinates and the maximum white luminance only, only the white luminance and the RGB color coordinates are expressed as characteristics, and a difference between the device A and the device B that are described above is not made clear. The method for evaluating a display by using the two-dimensional xy color reproduction coordinates and the maximum white luminance only has a problem that it is not possible to evaluate the display appropriately and thus not possible to discern the superiority or inferiority of the display performance.

Evaluation Method Performed by Characterization System 100

As illustrated in FIG. 1, the controller device 110 includes a communication unit 111 and a control unit 112.

The communication unit 111 communicates with the display 50 and the optical measuring device 120 through wireless communication or wired communication.

The control unit 112 is an arithmetic unit having a function of comprehensively controlling components of the controller device 110. For example, one or more processors (such as a CPU) run a program stored in one or more memories (such as a RAM and a ROM), and thereby the control unit 112 controls the components of the controller device 110.

In the characterization system 100, the controller device 110 displays white to fill the screen of the display 50 by using a function of the control unit 112. Note that a display state where white is displayed to fill the screen of the display 50 in this manner is referred to as a first display state. The control unit 112 causes the optical measuring device 120 to measure the tristimulus values X1, Y1, and Z1 of the spectrum of the display 50 in the first display state and acquires the result of the measurement. The control unit 112 then sets Xn, Yn, and Zn based on the tristimulus values X1, Y1, and Z1 obtained by measuring the first display state by the optical measuring device 120. In addition, a case where one color is displayed to fill the screen is conceivable as a second display state.

In addition, the control unit 112 displays a color including at least one of red, green, blue, white, and black in at least part of the screen of the display 50. A display state where a color including at least one of red, green, blue, white, and black is displayed in at least part of the screen of the display 50 is the second display state. The control unit 112 then causes the optical measuring device 120 to measure the tristimulus values of the spectrum of the display 50 in the second display state and acquires the result of the measurement. The control unit 112 then sets, as X, Y, and Z, the tristimulus values obtained by measuring the second display state by the optical measuring device 120.

Figure 2:
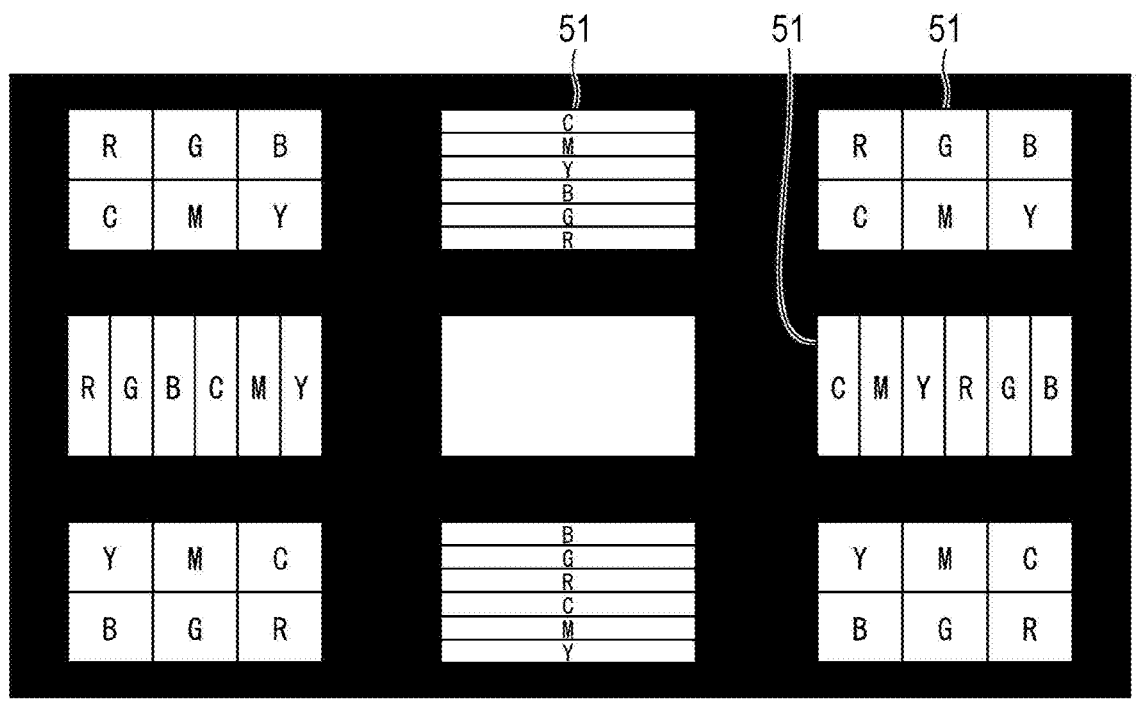
FIG. 2 is a view illustrating an example of a second display state.
Figure 3:
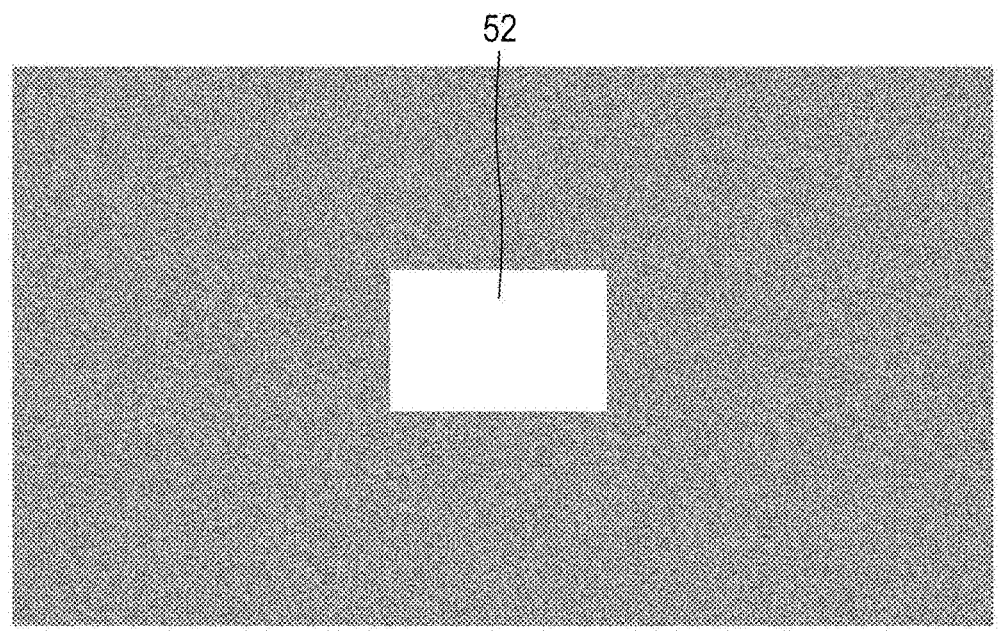
FIG. 3 is a view illustrating an example of the second display state.

FIGS. 2 and 3 are views respectively illustrating examples of the second display state. The second display state may be a state where multicolor patterns 51 are displayed on the display 50, as illustrated in FIG. 2. In the second display state where the multicolor patterns 51 are displayed on the display 50, various patterns having a plurality of colors including at least one of red, green, blue, white, and black are displayed.

The state where the multicolor patterns 51 are displayed includes a plurality of display windows displaying patterns in different forms in multicolor such as in red, green, blue, cyan, magenta, and yellow and a window displaying white. These display windows may be provided with a black background. In addition, in the second display state where the multicolor patterns 51 are displayed, the multicolor patterns 51 including a neutral color based on at least one of red, green, blue, white, and black may be displayed.

The second display state may also include a state where the display 50 performs gray window display in which a color display window 52 with a gray background is located in the central portion of the gray background, as illustrated in FIG. 3. In the second display state where the display 50 performs the gray window display, the color display window 52 occupying, for example, a 4% area of the display 50 is provided in the central portion of the gray background. A color including at least one of red, green, blue, white, and black is displayed in the color display window 52. A neutral color based on at least one of red, green, blue, white, and black may also be displayed in the color display window 52.

The second display state may also include a state where the display 50 performs gray window display in which the color display window 52 with a white background is located in the central portion. In the second display state where the display 50 performs the gray window display as described above, the color display window 52 occupies, for example, a 2% to 50% area, preferably a 25% area of the display 50 is provided in the central portion in the white background.

The control unit 112 has a function of turning on and off the displaying of black on the display 50 and can set the first display state where white is displayed to fill the screen of the display 50. In addition, the control unit 112 has stored, in the memory, the second display state where the multicolor patterns 51 or the 4% color display window 52 in the gray display is displayed on the display 50 and further has stored, in the memory, colors to be displayed in the central portion in the gray display. Note that the second display state is also referred to as multicolor display in the following description.

The second display state may also be displaying of one color filling the screen. As the color, a color including at least one of red, green, blue, white, and black is displayed. A neutral color based on at least one of red, green, blue, white, and black or a neutral color obtained by mixing these colors may be displayed.

The control unit 112 changes the color displayed in the multicolor patterns 51 or in the color display window 52 in the gray window display and displays the changed color on the display 50. Every time the color is changed, the optical measuring device 120 measures the luminance and the chromaticity thereof. Subsequently, the control unit 112 transforms the tristimulus values X, Y, and Z in each second display state by using the tristimulus values Xn, Yn, and Zn in the first display state and thereby calculates L*, a*, and b*. The control unit 112 then calculates the color volume of the color space formed from L*, a*, and b* thus calculated in each second display state. The control unit 112 outputs the calculated color volume of the color space formed from L*, a*, and b* and the value of Yn in the first display state via the communication unit.

As described above, in the first display state, white is displayed to fill the screen of the display 50, and thus the display 50 has the maximum display luminance. Since the tristimulus values in the first display state are set as Xn, Yn, and Zn, adaption of the sight of a person to the maximum display luminance of the display 50 can be specified. For example, for an Excel sheet or a document such as a Word document, white is displayed to almost fill the screen as the initial screen. From the viewpoint of a sight adaption to the screen, it is desirable that a state where white is displayed to fill the screen be used as the reference, also in the sense that almost only a screen comes in sight and the displaying is homogeneous screen displaying. Note that CIE specifies that in an environment in which there is ambient light around the display 50, the luminance of a white standard plate is set as an adaption point. However, in a case where the luminance at the time of displaying white filling the screen of the display 50 is low, and where the luminance is lower than the luminance of the white standard plate, the white display filling the screen of the display is seen as a gray display.

For example, in a case of 100 cd/m$^2$ as the luminance of the display 50 and approximately 500 lux in the ambient environment of the display 50 at the time of displaying white filling the screen of the display 50, it is likely that the color of a white object nearby is brighter than the display 50. In such a case, the screen of the display 50 on which white is displayed to fill the screen is likely to seen as a gray screen. Hence, setting the tristimulus values in the first display state as Xn, Yn, and Zn enables the luminance of the display 50 at the time of displaying white filling the screen of the display 50 to provide an index for visibility based on the room brightness enabling a color to be appropriately recognized with the eyes of a person.

In addition, in this embodiment, the control unit 112 calculates L*, a*, and b* by transforming the tristimulus values Xn, Yn, and Zn in the first display state and the tristimulus values X, Y, and Z in each second display state and calculates the color volume of the color space formed from L*, a*, and b*. The color volume of the color space formed from L*, a*, and b* represents the possibility of color expression displayable by the display 50. The color volume of the color space formed from L*, a*, and b* thus serves as an index for how brilliantly color is expressible in a state where the sight of a person adapts to the ambient environment of the display 50. A larger value of the color volume of the color space formed from L*, a*, and b* can represent the capability of more brilliant color expression.

In addition, the control unit 112 calculates the color volume of the color space formed from L*, a*, and b* by using the tristimulus values in the first display state as Xn, Yn, and Zn, and thus the evaluation can be based on the state of adaption of the sight of the person to the ambient environment of the display 50. Accordingly, in a display with all of the RGB values boosted, the color volume of a color space formed from L*, a*, and b* is large. In contract, in such a display that achieves bright white by boosting only the white value only when white occupies a small area, the color volume of the color space formed from L*, a*, and b* has a shape in which only an area near white is boosted, and the color volume is small.

For example, suppose that in the display in subpart (I) of part (c) of FIG. 11 and the display in subpart (III), the display in subpart (I) and the display in subpart (III) each have a white luminance of 540 cd/m$^2$, the white luminance being in the first display state at the time of displaying white filling the screen. In this case, the display in subpart (I) of part (c) of FIG. 11 does not have a high color purity, and thus the color volume of the color space formed from L*, a*, and b* calculated by using the tristimulus values in the first display state as Xn, Yn, and Zn is the same as that of the display in subpart (I) of part (c) of FIG. 11. In contrast, for the display in subpart (III) of part (c) of FIG. 11, the color volume of the color space formed from L*, a*, and b* is calculated by using the white luminance of 540 cd/m$^2$ instead of the peak luminance 1030 cd/m$^2$, and thus the color volume having the shape in subpart (III) of part (c) of FIG. 11 is obtained. Accordingly, it is determined that the display in subpart (III) of part (c) of FIG. 11 is superior to the display in subpart (I) of part (c) of FIG. 11.

According to this embodiment as described above, the control unit 112 calculates L*, a*, and b* by transforming Xn, Yn, and Zn as the tristimulus values in the first display state and the tristimulus values X, Y, and Z in each second display state and calculates the color volume of the color space formed from L*, a*, and b*. This enables the characteristics of the display 50 to be expressed appropriately.

As described above, the evaluation method according to this embodiment includes the following steps.

(Step S101)

The controller device 110 displays white to fill the screen of the display 50 by using the function of the control unit 112.

(Step S102)

The control unit 112 causes the optical measuring device 120 to measure the tristimulus values X1, Y1, and Z1 of the display 50 displaying white filling the screen and sets Xn, Yn, and Zn based on the tristimulus values X1, Y1, and Z1 obtained by the measurement.

(Step S103)

The controller device 110 displays a color including at least one of red, green, blue, white, and black in at least part of the screen of the display 50 by using the function of the control unit 112. A special example includes a case where a color is homogeneously displayed to fill the screen, a case where displaying is performed in an area occupying 1/25 (4%) of the screen, the area being obtained by multiplying horizontal 1/5 by vertical 1/5, and other cases.

(Step S104)

The control unit 112 causes the optical measuring device 120 to measure the tristimulus values of the display 50 displaying the color including the at least one of red, green, blue, white, and black in the at least part of the screen and sets the tristimulus values obtained by the measurement as X, Y, and Z.

Note that steps S101 and S102 may be performed before or after steps S103 and S104.

(Step S105)

The control unit 112 calculates L*, a*, and b* by transforming Xn, Yn, Zn, X, Y, and Z.

(Step S106)

The control unit 112 calculates the color volume of the color space formed from L*, a*, and b*.

(Step S107)

The control unit 112 outputs the Yn value in the state of displaying white filling the screen of the display 50 and the calculated color volume via the communication unit.

A user of the characterization system 100 can evaluate the characteristics of the display 50 based on the color volume output from the controller device 110. Note that the control unit 112 may be configured to have a function of evaluating the characteristics of the display 50 based on the color volume of the color space formed from L*, a*, and b* and to output the evaluation result.

(Step S108)

Note that white as the reference can be normalized in such a manner that a use environment is assumed. For example, when an office is considered, 350 cd/m² may be set as the reference in such a manner that 1000 lx is assumed. In the environment having an illumination with 500 lx, the luminance of the white standard plate is 500/3.14=165 cd/m². Calculation can be performed by using such a value as the reference. Accordingly, on the assumption that normalization is performed with such a fixed value, as long as relative evaluation of the performance of the display is performed, setting any value as the reference value does not cause a problem from a relative viewpoint. Hence, the numerical value can be simplified to 100 cd/m². To obtain Y=100 cd/m², normalization is performed based on xyY or the like in the state of displaying white filling the screen, a color volume is calculated based on L at this time, and the performance of the display is evaluated. When 100 cd/m² is considered to be the value of the white standard plate, this corresponds to evaluating the performance of the display in the ambient light environment with 314 lx.

Specifically, the tristimulus values obtained in step S104 are set as X1, Y1, Z1, a fixed value is set as A, and Xn=X1×A/Y1, Yn=A, and Zn=Z1×A/Y1 are set. It is convenient to use 100 cd/m² as the value of a fixed value A. Subsequently, steps S105, S106, and S107 described above are serially performed.

Figure 4:
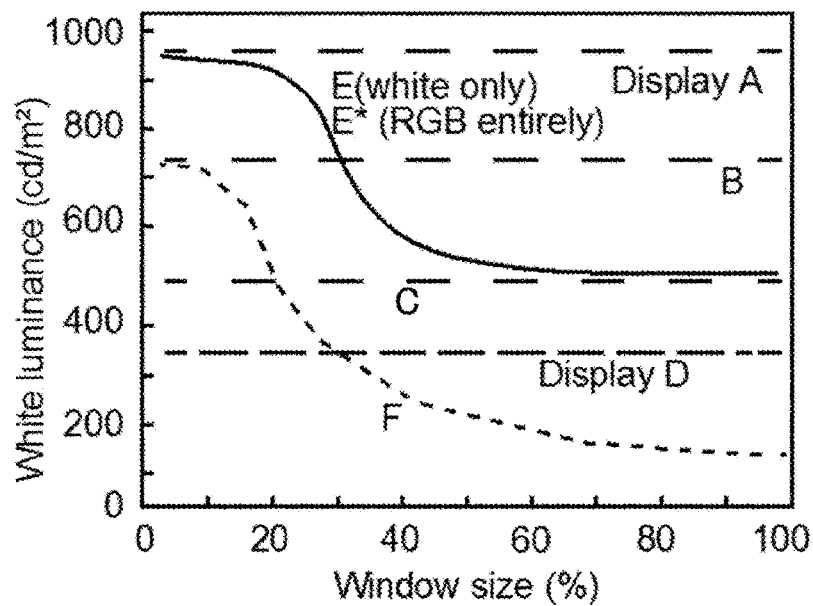
FIG. 4 is a graph illustrating the white luminance of a plurality of displays.

FIG. 4 is a graph illustrating the white luminance of displays A, B, C, D, E, E*, and F having respective different characteristics. In FIG. 4, the horizontal axis represents the size of a window displaying white (the proportion of an area to the full screen at a time when a white rectangle is displayed in the center of a black screen, that is, 100% corresponding to white displayed on the full screen, and 4% resulting from ⅕*⅕), and the vertical axis represents the luminance of white in the window. Table 1 and Table 2 describe the basic characteristics of the displays A, B, C, D, E, E*, and F.

As illustrated in FIG. 4 and Tables 1 and 2, the luminance of white does not depend on the window size in the displays A, B, C, and D. Each of the displays as described above typically has side edge backlight and is such a liquid crystal display device that has constant backlight luminance.

TABLE 1

|       | x      | Y      | Y (cd/m²) |
|-------|--------|--------|-----------|
| R     | 0.6682 | 0.3058 | 92.10     |
| G     | 0.2571 | 0.6687 | 363.1     |
| B     | 0.1552 | 0.0353 | 31.33     |
| C     | 0.1944 | 0.2769 | 392.7     |
| M     | 0.2862 | 0.1051 | 124.4     |
| Y     | 0.4041 | 0.5403 | 447.5     |
| White | 0.2771 | 0.2824 | 490.0     |
| Black | 0.347  | 0.351  | 0.2302    |

TABLE 2

| Display | Y (window size) | |
|---------|------|------|
|         | 25%  | 100% |
| A       | 960  | 960  |
| B       | 730  | 730  |
| C       | 490  | 490  |
| D       | 340  | 340  |
| E       | 920  | 490  |
| E*      | 920  | 490  |
| F       | 420  | 150  |

In contrast, in the displays E, E*, and F, the luminance of white depends on the window size. The smaller the window size, the higher the luminance. The display E is typically a display having W pixels in addition to RGB. The displays E* and F are typically liquid crystal displays having area-active-drive direct backlight. In the display F, the overall luminance is set lower than that of the display E, and particularly the luminance of white on the full screen is set low at approximately 100 cd/m².

Concerning the display E and the display F that are such typical displays, when the area proportion of the color display window 52 falls below 10%, the luminance of the displays E and F is almost saturated as illustrated in FIG. 4. In contrast, when the area proportion of the color display window 52 exceeds 40%, the luminance of the display E does not almost increase. Under these circumstances, it is desirable that the color display window 52 occupy a 25% area of the display that is taken as a middle value between these.

The display E undergoes adjustment in which only white is specially made brighter when window size is made smaller. Each of the displays E* and F undergoes adjustment in which all of the RGBW colors are specially made brighter when the window size is made smaller.

In comparison among the displays A, B, C, and D, in a case where values Xn, Yn, and Zn are determined based on the peak luminance of white of each display, the displays A, B, C, and D have the same color volume. This can lead to an appropriate index when each display alone is seen in a pitch-dark room. The peak white illustrated by the dotted line in FIG. 5 indicates the characteristics.

Also in the displays E* and F, all of the RGB colors have the peak luminance that is the maximum luminance and have the same color volume. In contrast, the display E having only white made brighter has a small color volume. This indicates a state where colors look paler because setting only white bright causes imbalance between white and other colors. However, such an index causes the display E to always have a score lower than the other displays however high the RGB luminance is high. It can be said that this is improper.

Nevertheless, the state where the displays alone are seen in the pitch-dark room is a special state. In a case where the displays are placed in a room in a light ambient environment, a case where displays arranged side by side are seen, or other cases, the display A having a higher luminance looks more brilliant than the display D having a lower luminance. To indicate such a state, a fixed value may preferably be used as the white reference for calculating the color volume. This is because a brighter display has a larger color volume.

Figure 5:
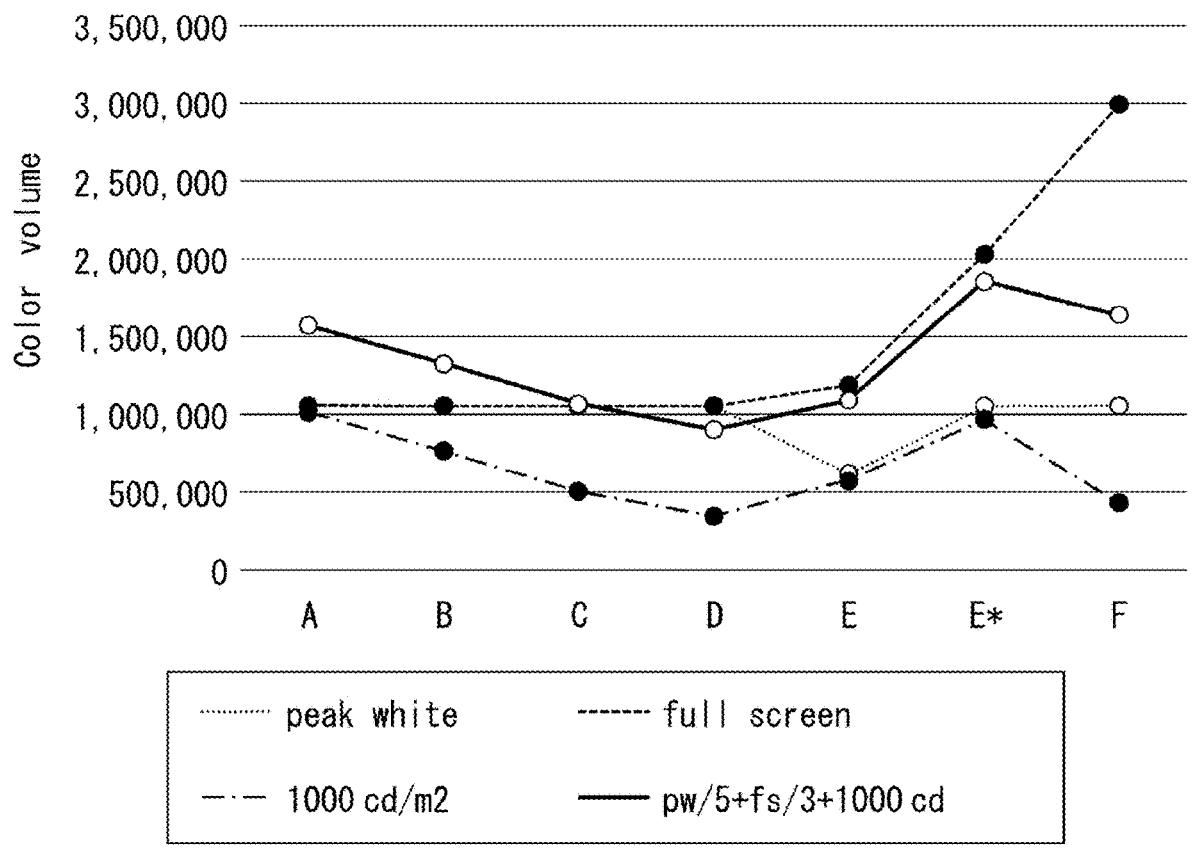
FIG. 5 is a graph illustrating the color volume of a plurality of displays.

The evaluation of color volumes using 1000 cd/m² as a fixed value A is illustrated by the dashed line in FIG. 5. HDR displays use a higher value as the maximum luminance than that of general displays. The value of 1000 cd/m² is one of reference values. In CIELAB, the maximum white luminance is generally used as white reference. The use of this value of 1000 cd/m² is thus suitable for general displays, particularly SDR (standard dynamic range) displays.

Suppose a case where the color volumes are evaluated by using 1000 cd/m² as a fixed value A as illustrated by the dashed line in FIG. 5. In this case, in comparison among the displays A, B, C, and D, the display A having a high white luminance has a large color volume, and the display E* with all the RGB colors having the maximum luminance has also a high value.

The display E* has a sight adaption point set lower than that of the display A. The display E* is devised in such a manner that for the case where the widow for displaying white is small, for example, in such a case where the moon in the night sky is displayed, or in a case where the evening sun is displayed, the luminance is set higher to stimulate the eyes to a higher degree and to affect the user. However, as illustrated by the dashed line in FIG. 5, the evaluation of the score based on the color volume of the display E* is lower than the score based on the color volume of the display A. This is because a display having a high luminance simply has a high score based on a favorable color volume.

Hence, to enable the display E to be evaluated more highly than the display A, evaluation using the luminance of white assuming that 100% is set for the window for displaying white as white reference is illustrated by the dashed line in FIG. 5. As illustrated by the dashed line in FIG. 5, in a case where the evaluation is performed by using the luminance of white assuming that 100% is set for the window for displaying white, the score based on the color volume of the display E* is higher than the score of the display A and is appropriately evaluated. However, it is understood that the display F is improperly highly evaluated because the luminance of white simply assuming that 100% is set for the window for displaying white is intentionally lowered and thus the score based on the color volume is made high in this case.

As described above, it can be said that if any of the indexes used for evaluating the displays is used alone, the index is not favorable. Hence, in this embodiment, points are added by performing weighting. Results of evaluation performed by adding points based on the weighting are illustrated by the solid line in FIG. 5. Herein, a color volume based on white on the full screen is set as V1, a color volume based on the fixed value 1000 cd/m² is set as V2, and a color volume based on a value for white (that is, white applying to a peak) in the measurement performed with color display performed in a part is set as V3. The total score (Total Score) is calculated by using the following Formula 11.

[Formula 11]

$$\text{Total Score} = \frac{V1}{3} + V2 + \frac{V3}{5} \quad \text{(Formula 11)}$$

As described above, values Xn, Yn, and Zn are set based on the tristimulus values X1, Y1, and Z1 obtained by measuring the first display state where white is displayed to fill the screen of the display 50. Tristimulus values obtained by measuring the second display state where the color including at least one of red, green, blue, white, and black is displayed in at least part of the screen of the display 50 are set as X, Y, and Z. Values L*, a*, and b* are calculated by transforming the values Xn, Yn, Zn, X, Y, and Z. The color volume of a color space formed from the values L*, a*, and b* is calculated. The value Yn in the first display state and the color volume are output. The color volume thus output is set as V1. The values Xn, Yn, and Zn are set by using 100 cd/m² or 1000 cd/m² as the fixed value A and based on the tristimulus values X1, Y1, and Z1 obtained by measuring the first display state where white is displayed to fill the screen of the display 50. The tristimulus values obtained by measuring the second display state where the color including the at least one of red, green, blue, white, and black is displayed in the at least part of the screen of the display 50 are set as X, Y, and Z. Values L*, a*, and b* are calculated by transforming the values Xn, Yn, Zn, X, Y, and Z. The color volume of a color space formed from the values L*, a*, and b* is calculated. The value Yn in the first display state and the color volume are output. The color volume thus output is set as V2. Further, the values Xn, Yn, and Zn are set based on tristimulus values obtained by measuring a third display state where white is displayed in at least part of the screen of the display 50. The tristimulus values obtained by measuring the second display state where the color including the at least one of red, green, blue, white, and black is displayed in the at least part of the screen of the display 50 are set as X, Y, and Z. Values L*, a*, and b* are calculated by transforming the values Xn, Yn, Zn, X, Y, and Z. The color volume of a color space formed from the values L*, a*, and b* is calculated. The value Yn in the first display state and the color volume are output. The color volume thus output is set as V3. Note that the third display state may be a state where a rectangular pattern is provided in at least part of the screen of the display 50 with a black background or where a multicolor pattern is displayed. The display characteristic of the display 50 may be evaluated in such a manner that a numerical value obtained by weighting and adding up the color volumes of V1, V2, and V3 is output as a value representing the display characteristic.

As illustrated by the solid line in FIG. 5, the evaluation of the display characteristic in the above-described manner leads to the ratings of the displays A, B, C, and D in this order. The evaluation of the display E is lower than that of the display B and higher than that of the display C. The evaluation of the display E* is higher than that of the display A.

The excessively high evaluation of the display F is attributable to a high score of the color volume V1 based on white on the full screen. This is because the luminance of white on the full screen is 100 cd/m² that is low. The lowness of the luminance represents the limitedness of a use environment. That is, in a case where the display F is used in a relatively light room (350 lux=100*π+α in this case), an event in which white looks like gray occurs.

Note that a display having boosted white and the same RGB luminance as that of a display without so-called boosting has a more favorable characteristic than that of the display without boosting. In contrast, the characteristic of the display with all the white and RGB colors boosted is favorable as compared to a display having a constant maximum luminance of the white and RGB colors. In view of the characteristics, weighting is performed. Numerical values are calculated by using Formula (11), Formula (12), and Formula (13) below in such a manner that the color volumes V1, V2, and V3 are weighted and averaged.

[Formula 11]

$$\text{Total Score} = \frac{V1}{3} + V2 + \frac{V3}{5} \quad \text{(Formula 11)}$$

$$\text{Total Score} = (V1 \times 2 + V2 \times 5 + V3 \times 1)/8 \quad \text{(Formula 12)}$$

$$\text{Total Score} = (V1 + V2 \times 7)/8 \quad \text{(Formula 13)}$$

A display having a high absolute luminance tends to look colorful. The color volume V2 thus accounts for a high proportion in the weighting. Formula (11) involves with weighting and addition of the color volume V2, and Formula (12) takes a form of a weighted average of the color volumes V1, V2, and V3. In addition, a display with white boosted has small color volumes of the color volume V1 and the color volume V3 like a display of a different type. Hence, the color volume V3 is omitted in Formula (13).

Experiment Results

Parts (a) of FIGS. 4 to 8 each illustrate a table describing the characteristics of the corresponding display in the xyY color system and illustrate luminance Y of each color on the two-dimensional plane xy. Parts (b) of FIGS. 4 to 8 each illustrate a graph representing the color volume of the color space formed from L*, a*, and b* calculated for the corresponding display by the control unit 112.

FIG. 6 illustrates the characteristics of the display 50 of a LCD (liquid crystal display) TV with RGB pixels that is driven standardly. FIG. 7 illustrates the characteristics of the display 50 of a LCDTV with RGB pixels that has a color filter with lowered color purity and that is driven standardly. The display having the characteristics illustrated in FIG. 7 has a low color reproducibility but has the same white luminance as that of the display having the characteristics illustrated in FIG. 6. FIG. 8 illustrates the characteristics of the display 50 of a LCDTV with RGBW pixels, the characteristics having a general color purity and boosted white in the second display state. Note that for each display 50 having the characteristics illustrated in a corresponding one of FIGS. 4 to 6, the white luminance in the multicolor display, that is, the white luminance of white displayed in the small display window in the multicolor display illustrated in FIG. 2 or FIG. 3 is used as the reference, and thereby the color volume of the color space formed from L*, a*, and b* is obtained.

Each display 50 having the characteristics illustrated in the corresponding one of FIGS. 4 to 6 has the same results as those of the characteristics schematically illustrated in the corresponding one of subpart (I), subpart (II), and subpart (III) of part (c) of FIG. 11. As described above, in the case where the color volume of the color space formed from L*, a*, and b* is obtained by using the white luminance at the time of displaying multicolor patterns as the reference, it is not possible to express the characteristics of the display 50 appropriately.

The adaption of the sight of a person can be decided based on the luminance at the time of displaying white filling the screen of the display 50. Hence, the tristimulus values obtained by causing the optical measuring device 120 to measure the first display state where white is displayed to fill the screen of the display 50 are set as Xn, Yn, and Zn, and thereby the color volume of the color space formed from L*, a*, and b* is obtained. Results are illustrated in FIG. 9 and FIG. 10.

FIG. 9 illustrates the characteristics of a display 50 of a LCDTV with RGBW pixels that has a function of boosting white in the second display state, like FIG. 8. As illustrated in FIG. 9, it is understood that the color volume calculated in such a manner that the tristimulus values in the first display state where white is displayed to fill the screen of the display 50 are set as Xn, Yn, and Zn is 1,113,222 and is higher than 999,430 that is the color volume obtained for the display 50 that is driven standardly illustrated in FIG. 6.

As described above, the tristimulus values in the first display state are set as Xn, Yn, and Zn, and the color volume of the color space formed from L*, a*, and b* is obtained. In the LCDTV with RGBW pixels, the characteristics of the display 50 having the function of boosting white in the second display state can thereby be evaluated fairly.

FIG. 10 illustrates the characteristics of a display 50, such as a LCD, having a function of raising the display luminance in the second display state as compared to the first display state where white is displayed to fill the screen, the display luminance being raised by raising the luminance of a backlight in an in-plane area that is part of the display. As described above, in the display 50 capable of raising the display luminance in the second display state by changing the luminance of the backlight, values for RGB can be boosted together. The color volume calculated from the characteristics of the display 50 as described above by using the white luminance in the second display state is identical to 999,430 that is the color volume obtained in the display driven standardly. However, since the white luminance in the second display state is higher than the white luminance in the first display state, the color volume calculated by using the white luminance in the first display state has a value of 1,905,226 larger than 999,430.

Table 1 is a table describing color volumes resulting from the calculation for the display having the characteristics illustrated in FIG. 6, the display having the characteristics illustrated in FIG. 7, the display having the characteristics illustrated in FIG. 9, and the display having the characteristics illustrated in FIG. 10. Table 1 includes color volumes calculated by using the white luminance in the second display state (multicolor display) and color volumes calculated by using the white luminance in the first display state (displaying white filling the screen). In the display configured to change the luminance of the backlight, not only white but also all of the colors exhibit a high luminance, thus colors can be displayed more brilliantly, and the characteristics thereof are evaluated fairly based on the large color volume.

TABLE 3

| | Driving | Luminance of white on full screen | White luminance in multicolor patterns | Color volume normalized with white in multicolor | Color volume normalized with white on full screen |
|---|---|---|---|---|---|
| (1) Standard monitor | No boosting or the like | 540.31 | 540.31 | 999,430 | 999,430 |
| (2) Low color purity monitor | No boosting or the like | 540.31 | 540.31 | 588,349 | 588,349 |
| (3) RGB + W pixels | Only white boosting in 4% window | 540.31 | 1030 | 583,966 | 1,113,222 |
| (4) RGB pixels | RGB and white boosting in 4% window | 540.31 | 1030 | 999,430 | 1,905,226 |

As illustrated in Table 3, the characterization system 100 according to this embodiment outputs the color volume calculated by setting, as Xn, Yn, and Zn, the tristimulus values obtained by measuring the first display state by the optical measuring device 120. In the first display state, white is displayed to fill the screen of the display 50. As described above, the characteristics of the display 50 are evaluated by using the color volume calculated based on the white luminance in the first display state at the time of displaying white filling the screen, and thereby it is possible to appropriately discern the superiority or inferiority of the display performance also for the display having not only RGB but also W pixels and the display capable of displaying with boosted values of all colors by raising backlight luminance in multicolor display. Accordingly, a display with a high color reproducibility and usable in the ambient light environment can be evaluated appropriately.

REFERENCE SIGNS LIST 50 display (display device)
100 characterization system
110 controller device
112 control unit
120 optical measuring device (spectrometer)

The invention claimed is:

1. A characterization system that evaluates a display characteristic of a display device, the characterization system comprising:
 a controller device that controls displaying performed by the display device; and an optical measuring device,
 wherein the controller device
 sets values Xn, Yn, and Zn based on tristimulus values X1, Y1, and Z1 obtained by measuring, by the optical measuring device, a first display state where white is displayed to fill a screen of the display device,
 sets, as values X, Y, and Z, tristimulus values obtained by measuring, by the optical measuring device, a second display state where a color including at least one of red, green, blue, white, and black is displayed in at least part of the screen of the display device,
 calculates values L*, a*, and b* by transforming the values Xn, Yn, and Zn and the values X, Y, and Z,
 calculates a color volume of a color space formed from the values L*, a*, and b*, and
 outputs the value Yn in the first display state and the color volume.

2. The characterization system according to claim 1, wherein Xn=X1, Yn=Y1, and Zn=Z1 are respectively set for the values Xn, Yn, and Zn.

3. The characterization system according to claim 1, wherein Xn=A×X1/Y1, Yn=A, and Zn=A×Z1/Y1 are calculated with a fixed value serving as A.

4. The characterization system according to claim 1, wherein 100 cd/m$^2$ is used as a fixed value serving as A.

5. The characterization system according to claim 1, wherein 1000 cd/m$^2$ is used as a fixed value serving as A.

6. The characterization system according to claim 1, wherein the second display state includes a state where a multicolor pattern is displayed by the display device.

7. The characterization system according to claim 1, wherein the second display state includes a state where the display device performs gray window display in which a color display window with a gray background is located in a central portion of the gray background.

8. The characterization system according to claim 1, wherein the second display state includes a state where the display device performs gray window display in which a color display window with a white background is located in a central portion of the white background and where a screen proportion of the color display window ranges from 2% to 50%.

9. The characterization system according to claim 8, wherein in the second display state, the screen proportion of the color display window in the central portion is 25%.

10. The characterization system according to claim 1, wherein the second display state includes a state where a neutral color based on at least one of red, green, blue, white, and black is displayed.

11. The Characterization system according to claim 1, wherein the optical measuring device is a spectrometer that measures a spectral value in each of the first display state and the second display state.

12. A characterization method for evaluating a display characteristic of a display device, the method comprising:
 setting values Xn, Yn, and Zn based on tristimulus values X1, Y1, and Z1 obtained by measuring a first display state where white is displayed to fill a screen of the display device;
 setting, as values X, Y, and Z, tristimulus values obtained by measuring a second display state where a color including at least one of red, green, blue, white, and black is displayed in at least part of the screen of the display device;
 calculating values L*, a*, and b* by transforming the values Xn, Yn, and Zn and the values X, Y, and Z;
 calculating a color volume of a color space formed from the values L*, a*, and b*; and
 outputting the value Yn in the first display state and the color volume.

13. A characterization method for evaluating a display characteristic of a display device, the method comprising:
 setting values Xn, Yn, and Zn based on tristimulus values X1, Y1, and Z1 obtained by measuring a first display state where white is displayed to fill a screen of the display device;
 setting, as X, Y, and Z, tristimulus values obtained by measuring a second display state where a color including at least one of red, green, blue, white, and black is displayed in at least part of the screen of the display device;
 calculating values L*, a*, and b* by transforming the values Xn, Yn, Zn, X, Y, and Z;
 calculating a color volume of a color space formed from the values L*, a*, and b*;
 outputting the value Yn in the first display state and the color volume;
 setting the output color volume as V1; based on the tristimulus values X1, Y1, and Z1 obtained by measuring the first display state where white is displayed to fill the screen of the display device,
 setting the values Xn, Yn, and Zn by using 100 cd/m$^2$ or 1000 cd/m$^2$ as a fixed value A;
 setting, as X, Y, and Z, the tristimulus values obtained by measuring the second display state where the color including the at least one of red, green, blue, white, and black is displayed in the at least part of the screen of the display device;
 calculating values L*, a*, and b* by transforming the values Xn, Yn, Zn, X, Y, and Z;
 calculating a color volume of a color space formed from the values L*, a*, and b*;

outputting the value Yn in the first display state and the color volume;

setting the output color volume as V2;

setting values Xn, Yn, and Zn based on tristimulus values obtained by measuring a third display state where white is displayed in at least part of the screen of the display device;

setting, as X, Y, and Z, the tristimulus values obtained by measuring the second display state where the color including the at least one of red, green, blue, white, and black is displayed in the at least part of the screen of the display device;

calculating values L*, a*, and b* by transforming the values Xn, Yn, Zn, X, Y, and Z;

calculating a color volume of a color space formed from the values L*, a*, and b*;

outputting the value Yn in the first display state and the color volume;

setting the output color volume as V3; and outputting a numerical value representing a display characteristic, the numerical value being obtained by weighting and adding up the color volumes respectively set as V1, V2, and V3.

14. The characterization method according to claim 13, wherein calculation of the numerical value obtained by weighting and adding up the color volumes respectively set as V1, V2, and V3 is performed by using a calculation expression that is

V1×1/3+V2+V3×1/5.

15. The characterization method according to claim 13, wherein calculation of a numerical value obtained by weighting and averaging the color volumes respectively set as V1, V2, and V3 is performed by using a calculation expression that is (V1×2+V2×5+V3×1)/8.

16. The characterization method according to claim 13, wherein calculation of a numerical value obtained by weighting and averaging the color volumes respectively set as V1, V2, and V3 is performed by using a calculation expression that is (V1+V2×7)/8.

* * * * *